C. BOSCH.
ABSORBING AMMONIA AND APPARATUS THEREFOR.
APPLICATION FILED JULY 7, 1913.
1,216,059.  Patented Feb. 13, 1917.
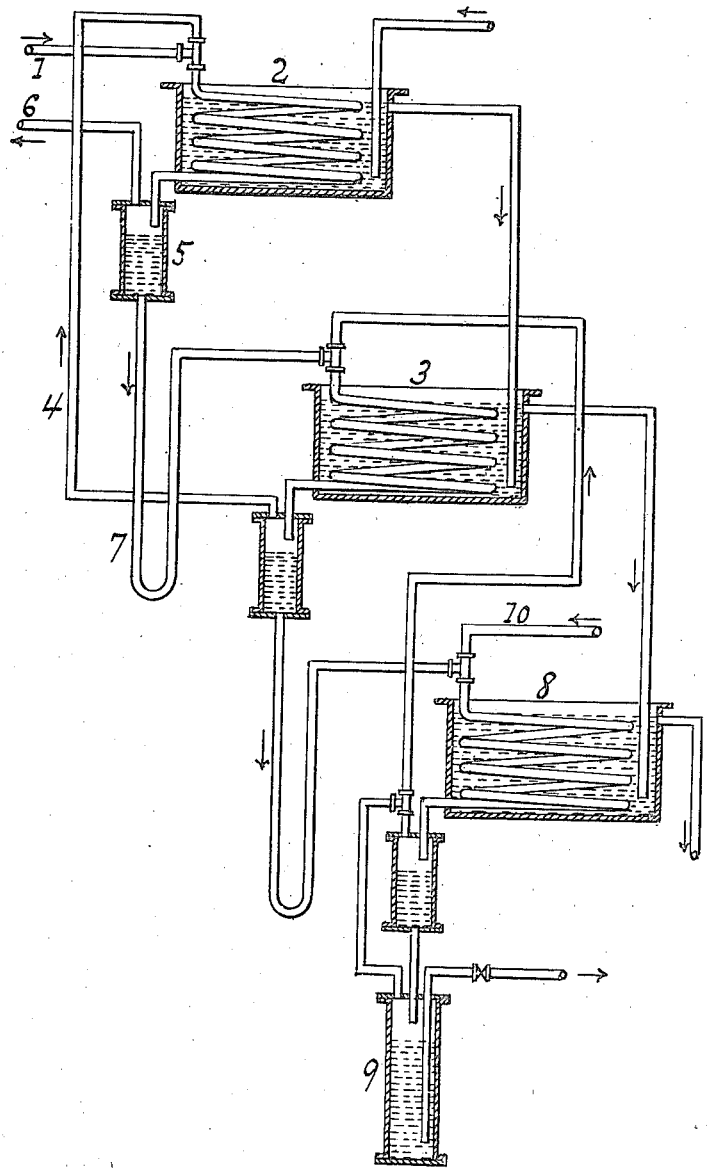
Witnesses:
William Miller
Chas. H. Almstead
Inventor
Carl Bosch
By his Attorneys
Hauff & Warland

UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ABSORBING AMMONIA AND APPARATUS THEREFOR.

1,216,059. Specification of Letters Patent. Patented Feb. 13, 1917.

Application filed July 7, 1913. Serial No. 777,739.

*To all whom it may concern:*

Be it known that I, CARL BOSCH, a citizen of the German Empire, residing at Ludwigshafen-on-the-Rhine, Germany, have invented new and useful Improvements in Absorbing Ammonia and Apparatus Therefor, of which the following is a specification.

The separation of ammonia from gas mixtures under pressure, by dissolving out the ammonia by means of a liquid, presents difficulties when the means which it has hitherto been customary to use (such for instance as a system of washbottles, or washing towers) are employed.

According to the process of the present invention I effect the absorption of ammonia from such gas mixtures under considerable pressure, that is to say under a pressure greater than that required merely to move the gas mixture through the apparatus, by introducing the absorbing liquid and treating the gas mixture with it in a tube in such a way that the gas and the absorbing liquid move in the same direction through the said tube. A more specific method according to this invention of absorbing ammonia from gases under considerable pressure consists in introducing the absorbing liquid and treating the gas mixture with it in a series of tubes in such a way that, as regards the series as a whole, the gases and absorbent move in opposite directions, while in each unit of the series they move in the same direction.

A method which is eminently adapted for absorbing ammonia according to this invention is to superimpose, for example, three coiled tubes so that water which is pumped under pressure into the upper coil runs through this and then by gravity runs down to the middle coil and, after passing through this, runs to and through the lowest coil, and from this to a suitable receptacle, whence it can be drawn off in any suitable manner. In the meantime the gases containing ammonia are passed into the upper end of the lowest coil and through this in the same direction as the absorbing liquid. From the lower end of the lowest coil the gases leave the absorbing liquid and are led to the upper end of the middle coil, so that in this coil also the gases and the absorbing liquid pass in the same direction through the coil, that is, from top to bottom. The gases leaving the lower end of the middle coil then pass to the top of the upper coil and, as is the case in the other coils, the gases and the absorbing liquid pass through the coil in the same direction, that is, from top to bottom. Thus in the upper coil the gases which are poorest in ammonia, since they have twice been subjected to the action of the absorbing liquid, are treated with fresh water and in this way a maximum of ammonia is extracted from the gases. Each of the said coils should preferably be immersed in a water-bath, or subjected to other means of cooling, so as to remove the heat caused by the absorption of the ammonia. In this way the gases are obtained free or almost free from ammonia and the liquid emerging from the lower coil can be obtained of greater or less concentration as desired.

Apparatus illustrating this method of absorbing ammonia is shown in the accompanying figure which represents diagrammatically a vertical section of such apparatus. The absorbing liquid enters through the pipe 1 into the first absorbing coil 2, while the gas leaving the second absorbing coil 3 passes through the pipe 4 which also leads to the coil 2. The absorbing liquid and the residual gas leaving the coil 2 pass through the stripper 5, the gas being led away through the pipe 6, while the absorbing liquid enters the coil 3 after having passed through a siphon 7; then, after having passed through coil 3, it passes to a third coil 8. The concentrated ammonia solution is finally collected in a vessel 9, from which it can be led off as desired. The gases containing ammonia enter the absorbing system through the pipe 10 and take the path indicated by the arrows, passing in succession through the coils 8, 3 and 2, in each traveling through the said coils from top to bottom, that is, in the same direction as the absorbing liquid.

Now what I claim is:—

1. The process of absorbing ammonia from gas mixtures under pressure by introducing the absorbing liquid and treating the gas mixture with it in a series of tubes in such a way that, as regards the series as a whole, the gases and absorbent move in opposite directions, while in each unit of the series they move in the same direction.

2. The process of absorbing ammonia from gas mixtures under pressure by introducing the absorbing liquid and allowing it to flow from above below through a plurality of coils situated one above the other and passing the gases in the same direction as the absorbing liquid through each individual coil, but through the coils as a whole from below above, so that the gases which are richest in ammonia meet that absorbing liquid which is richest in ammonia.

3. The process of absorbing ammonia from gas mixtures under pressure by introducing the absorbing liquid and allowing it to flow from above below through a plurality of coils situated one above the other and passing the gases in the same direction as the absorbing liquid through each individual coil, but through the coils as a whole from below above, so that the gases which are richest in ammonia meet that absorbing liquid which is richest in ammonia, and subjecting each coil to a cooling action by surrounding it with a cooling liquid.

4. Apparatus for absorbing ammonia from gases containing it under pressure, comprising a plurality of coils situated one above the other, means for introducing the absorbing liquid and means for allowing the said absorbing liquid to flow through the coils in succession from above to below, and means for passing the gases through each individual coil from above downward, but through the series of coils in the direction from below upward.

5. Apparatus for absorbing ammonia from gases containing it comprising a plurality of coils situated one above the other, means for allowing the absorbing liquid to flow through the coils in succession from above downward, and means for passing the gases through each individual coil from above downward, but through the series of coils in the direction from below upward, and means for subjecting the coils to a cooling action.

6. Apparatus for absorbing ammonia from gases containing it comprising a plurality of coils situated one above the other, means for allowing the absorbing liquid to flow through the coils in succession from above downward, and means for passing the gases through each individual coil from above downward, but through the series of coils in the direction from below upward, and means to enable the gases to separate from the liquid, after the mixture of gas and liquid leaves each coil.

7. Apparatus for absorbing ammonia from gases containing it comprising a plurality of coils situated one above the other, means for allowing the absorbing liquid to flow through the coils in succession from above downward, and means for passing the gases through each individual coil from above downward, but through the series of coils from below upward, and means to enable the gases to separate from the liquid, after the mixture of gas and liquid leaves each coil, and means for subjecting the coils to a cooling action.

In testimony whereof I have hereunto set my hand in the presence of two subscribing witnesses.

CARL BOSCH.

Witnesses:
J. ALEC LLOYD,
JOSEPH PFEIFFER.